United States Patent
Johnson (10) Patent No.: US 10,728,619 B2
(45) Date of Patent: Jul. 28, 2020

(54) SYSTEMS AND METHODS FOR PLAYBACK RESPONSIVE ADVERTISEMENTS AND PURCHASE TRANSACTIONS

(71) Applicant: PUCs, LLC, Los Angeles, CA (US)

(72) Inventor: Charles Johnson, Los Angeles, CA (US)

(73) Assignee: PUCs, LLC, Los Angeles, CA (US)

( * ) Notice: Subject to any disclaimer, the term of this patent is extended or adjusted under 35 U.S.C. 154(b) by 0 days.

(21) Appl. No.: 16/228,607

(22) Filed: Dec. 20, 2018

(65) Prior Publication Data

US 2019/0208273 A1 Jul. 4, 2019

Related U.S. Application Data

(60) Provisional application No. 62/612,588, filed on Dec. 31, 2017.

(51) Int. Cl.
| | |
|---|---|
| *H04N 7/10* | (2006.01) |
| *H04N 21/458* | (2011.01) |
| *H04N 21/44* | (2011.01) |
| *H04N 21/478* | (2011.01) |
| *H04N 21/466* | (2011.01) |
| *H04N 21/81* | (2011.01) |

(52) U.S. Cl.
CPC ..... *H04N 21/458* (2013.01); *H04N 21/44016* (2013.01); *H04N 21/4667* (2013.01); *H04N 21/47815* (2013.01); *H04N 21/812* (2013.01)

(58) Field of Classification Search
CPC .......... H04N 21/458; H04N 21/44016; H04N 21/47815; H04N 21/4667; H04N 21/812; H04N 21/2668; H04N 21/6582; H04N 21/44204

USPC .......................................................... 725/34
See application file for complete search history.

(56) References Cited

U.S. PATENT DOCUMENTS

| | | | | |
|---|---|---|---|---|
| 5,758,257 | A * | 5/1998 | Herz | G06Q 20/383 348/E7.056 |
| 6,057,872 | A * | 5/2000 | Candelore | H04N 7/17318 725/23 |
| 6,457,010 | B1 * | 9/2002 | Eldering | G06Q 30/02 |
| 7,194,757 | B1 * | 3/2007 | Fish | G06Q 10/10 348/E7.07 |
| 8,381,241 | B2 * | 2/2013 | Ramaswamy | H04H 20/14 725/14 |
| 8,478,664 | B1 * | 7/2013 | Xavier | G06Q 30/00 705/26.1 |
| 8,775,256 | B2 * | 7/2014 | Rosenberg | G06Q 30/0241 705/14.59 |
| 9,654,815 | B2 * | 5/2017 | Czeck, Jr. | H04N 21/2668 |
| 9,674,565 | B2 * | 6/2017 | Natarajan | H04N 21/25816 |
| 9,743,136 | B2 * | 8/2017 | Meoded | G06Q 30/0264 |

(Continued)

*Primary Examiner* — Michael B. Pierorazio
(74) *Attorney, Agent, or Firm* — Fish IP Law, LLP (57) ABSTRACT

In a method for displaying tailored advertising in response to user media playback behavior, an ad engine detects media playback by a user. The ad engine retrieves an advertisement rule associated with the user. Following retrieval of the advertisement rule, the ad engine analyzes the content associated with the media playback and queues user tailored advertisements based on the analyzed content and the advertisement rule. The ad engine then displays an advertisement in response to detecting a pause in the media playback in a content provider-based software application.

12 Claims, 4 Drawing Sheets

(56) References Cited

U.S. PATENT DOCUMENTS

| | | | |
|---|---|---|---|
| 9,788,079 B2* | 10/2017 | Chand | H04N 21/812 |
| 9,800,949 B2* | 10/2017 | Cansler | H04N 7/17318 |
| 9,961,388 B2* | 5/2018 | Harrison | H04N 21/233 |
| 9,986,299 B2* | 5/2018 | Garcia Navarro | H04N 21/4826 |
| 10,178,436 B2* | 1/2019 | Jamil | H04N 21/4662 |
| 10,187,689 B2* | 1/2019 | Nguyen | H04N 21/4331 |
| 10,462,508 B2* | 10/2019 | Jung | H04N 21/251 |
| 2002/0108114 A1* | 8/2002 | Shinohara | G06F 3/0481 725/46 |
| 2002/0138848 A1* | 9/2002 | Alao | H04N 21/812 725/109 |
| 2003/0149618 A1* | 8/2003 | Sender | G06Q 30/02 705/14.55 |
| 2004/0034874 A1* | 2/2004 | Hord | H04N 5/76 725/136 |
| 2004/0079798 A1* | 4/2004 | Messenger | G06Q 30/06 235/381 |
| 2004/0255322 A1* | 12/2004 | Meadows | H04N 7/17309 725/23 |
| 2005/0091069 A1* | 4/2005 | Chuang | G06Q 30/0207 705/307 |
| 2005/0193416 A1* | 9/2005 | Przybylek | H04N 21/466 725/53 |
| 2007/0162951 A1* | 7/2007 | Rashkovskiy | H04H 20/106 725/134 |
| 2007/0214473 A1* | 9/2007 | Barton | G11B 27/105 725/28 |
| 2008/0092181 A1* | 4/2008 | Britt | H04N 7/1675 725/87 |
| 2008/0282285 A1* | 11/2008 | Thomas | H04N 5/76 725/32 |
| 2010/0030808 A1* | 2/2010 | Ress | H04N 21/21 709/227 |
| 2010/0158101 A1* | 6/2010 | Wu | H04N 21/23424 375/240.01 |
| 2010/0205541 A1* | 8/2010 | Rapaport | G06Q 10/10 715/753 |
| 2011/0289538 A1* | 11/2011 | Begen | H04L 65/605 725/107 |
| 2012/0124618 A1* | 5/2012 | Ruiz-Velasco | G06Q 30/0241 725/32 |
| 2013/0139191 A1* | 5/2013 | Ren | H04N 21/2541 725/1 |
| 2013/0145383 A1* | 6/2013 | Hao | H04N 21/2393 725/1 |
| 2014/0157295 A1* | 6/2014 | Jagtiani | H04N 21/25891 725/13 |
| 2018/0063591 A1* | 3/2018 | Newman | H04N 21/4826 |
| 2018/0367863 A1* | 12/2018 | Newman | H04N 21/44204 |
| 2019/0098352 A1* | 3/2019 | Jung | H04N 21/2668 |

* cited by examiner

SYSTEMS AND METHODS FOR PLAYBACK RESPONSIVE ADVERTISEMENTS AND PURCHASE TRANSACTIONS

FIELD OF THE INVENTION

The field of the invention is interactive media playback.

BACKGROUND

Conventional advertisements play at prearranged commercial breaks and are severely limited in their interactivity. Content from streaming websites often contains at least one advertisement break when one or more advertisements are played back. Often, these advertisements repeat as conventional systems fail to tailor the advertisements to the particular user viewing the advertisement. Further, the advertisements in conventional streaming content have limited interactive elements, including, for example, skipping an advertisement or clicking a hyperlink to take you to a separate website.

U.S. Patent Application Publication No. 2008/0282285 to Thomas discloses a method of substituting pause-time content in place of media that is paused. Among other things, Thomas does not disclose analyzing the media content and user data to queue advertisements to over-the-top (OTT) internet signals. Additionally, Thomas does not contemplate the use of interactive advertisements that can work with a single user device or cooperatively with multiple user devices to receive user input and execute transactions directly from the interactive advertisement.

U.S. Patent Application Pub. No. 2004/0034874 A1 to Hord discloses advertisement playback during trick mode functionality. However, Hord does not disclose the delivery of interactive advertisements. Further, Hord does not disclose the queuing of advertisements prior to advertisement playback based on user data, media data, and advertisement data.

Similarly to Hord, U.S. Patent Application Pub. No. 2007/0162951 A1 to Rashkovskly discloses advertisement playback during paused content. However, Rashkovskly does not disclose the delivery of interactive advertisements. As with Hord, Rashkovskly also does not disclose the queuing of advertisements prior to advertisement playback based on user data, media data, and advertisement data.

U.S. Pat. No. 8,775,256 to Rosenberg discloses a hardware implementation of pause ads and content delivery. Rosenberg integrates advertisement delivery into a piece of hardware (e.g., a set top box/device), and advertisements are served to that device and displayed from that device. However, Rosenberg does not contemplate the delivery of conventional and/or interactive advertisements through software-based mediums, including, for example, audio delivery applications, long form content applications, and gaming applications.

Thomas, Hord, Rashkovskly, Rosenberg, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Conventional advertisement systems can be improved by using user data, media data, and advertisement data to select one or more advertisements for playback during a partial or complete pause in media playback. By using a wider array of data to make advertisement playback decisions, the present invention is an improvement over the prior art because it allows highly user and media-relevant advertisements to be played back during a partial or complete pause in media playback.

Thus, there is still a need for systems and methods for improving advertisement playback based on user data, media data, and advertisement data.

SUMMARY OF THE INVENTION

Among other things, the inventive subject matter provides apparatus, systems, and methods for displaying tailored advertising in response to user media playback behavior.

The inventive concept herein can be employed in a variety of applications, including, for example, long and short form video content, video game-based software content, and long and short form audio content. Conventional advertisement delivery systems do not contemplate the delivery of interactive advertisements to any device through software applications during pauses in content playback or interaction (e.g., pauses in playing video games). As such, the claimed invention improves upon the conventional advertisement delivery systems by enabling interactive advertisement delivery to software applications, which allows advertisement delivery to any software through any type of media playback device.

Various resources, features, aspects and advantages of the inventive subject matter will become more apparent from the following detailed description of preferred embodiments, along with the accompanying drawing figures in which like numerals represent like components.

The present invention advantageously allows advertisements to playback when media content is partially or completely paused.

DETAILED DESCRIPTION

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
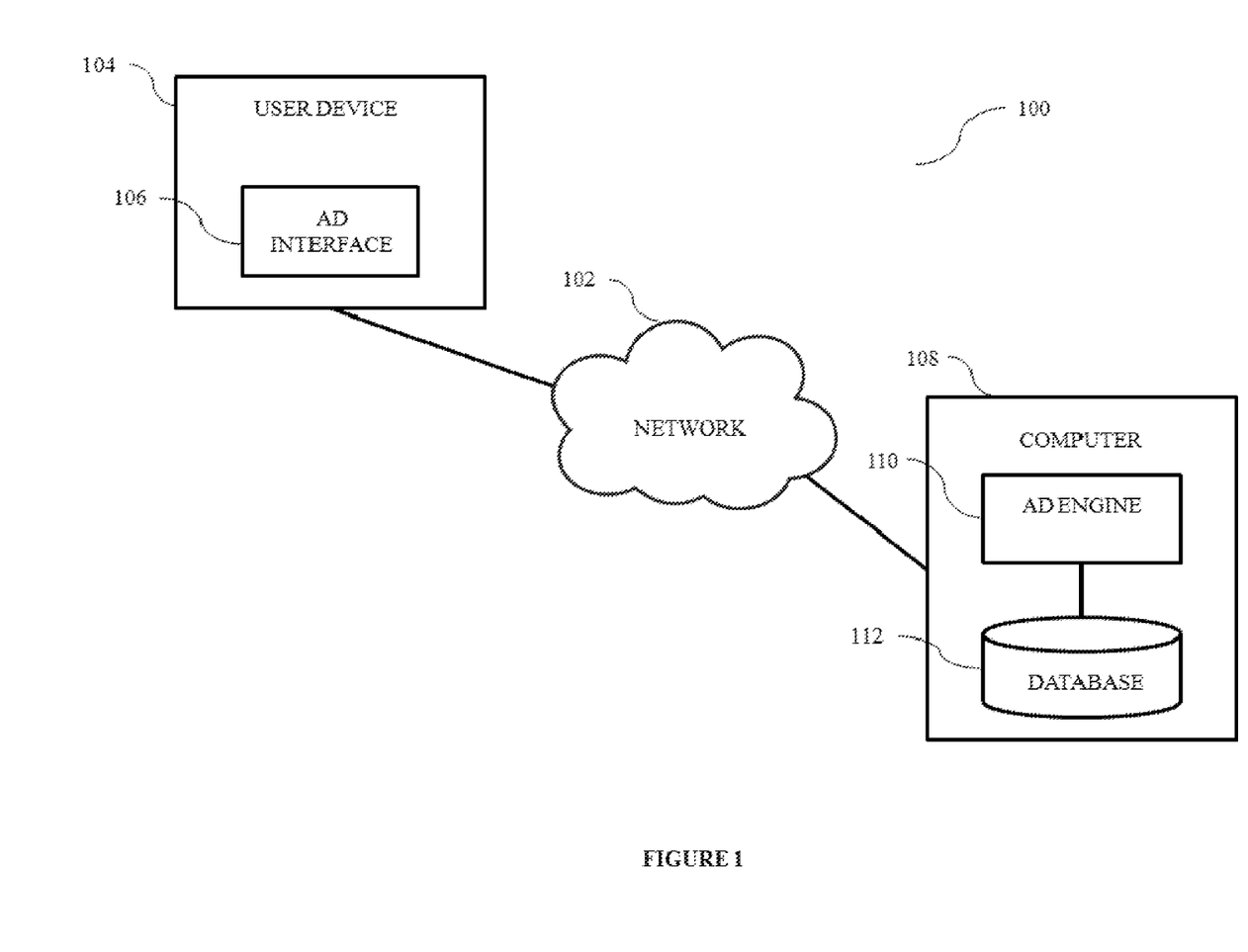
FIG. 1 is a functional block diagram illustrative a distributed data processing environment.

FIG. 1 is a functional block diagram illustrative a distributed data processing environment.

As used herein, the term "distributed" describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes user device 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between user device 104, server computer 108, and any other computing devices (not shown) within distributed data processing environment 100.

It is contemplated that user device 104 can be any programmable electronic computing device capable of communicating with various components and devices within distributed data processing environment 100, via network 102. It is further contemplated that user device 104 can execute machine readable program instructions and communicate with any devices capable of communication wirelessly and/or through a wired connection. For example, user device 104 can be any one or more of smart phones, desktop computers, tablet computers, laptops, and smart watches. It is contemplated that user device 104 also includes any one or more communicatively coupled peripheral electronic devices (e.g., computer mice, keyboards, electronic sensors, communication devices, storage devices, etc.). User device 104 includes an instance of ad interface 106.

Ad interface 106 provides a user interface to ad engine 110. Preferably, ad interface 106 comprises a graphical user interface (GUI) or a web user interface (WUI) that can display one or more of text, documents, web browser windows, user option, application interfaces, and operational instructions. It is also contemplated that the ad interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

Ad interface 106 allows a user to register with and configure ad engine 110 (discussed in more detail below) to enable ad engine 110 to track user activity and preferences and respond to user media playback actions. It is contemplated that ad interface 106 allows a user to provide any information to ad engine 110. For example, a user can input authentication, advertisement parameters, product purchases, user information, and any other information that is used by ad engine 110. As used herein, "advertisement parameters" comprise any variable(s) that can directly or indirectly control how ad engine 110 executes advertisements and receives user inputs.

Ad interface 106 is also contemplated to allow a user to complete any type of transaction. For example, ad interface 106 can receive user payment data and execute a financial transaction. In another example, ad interface 106 can receive user credentials to log-in to third-party services.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Figure 2:
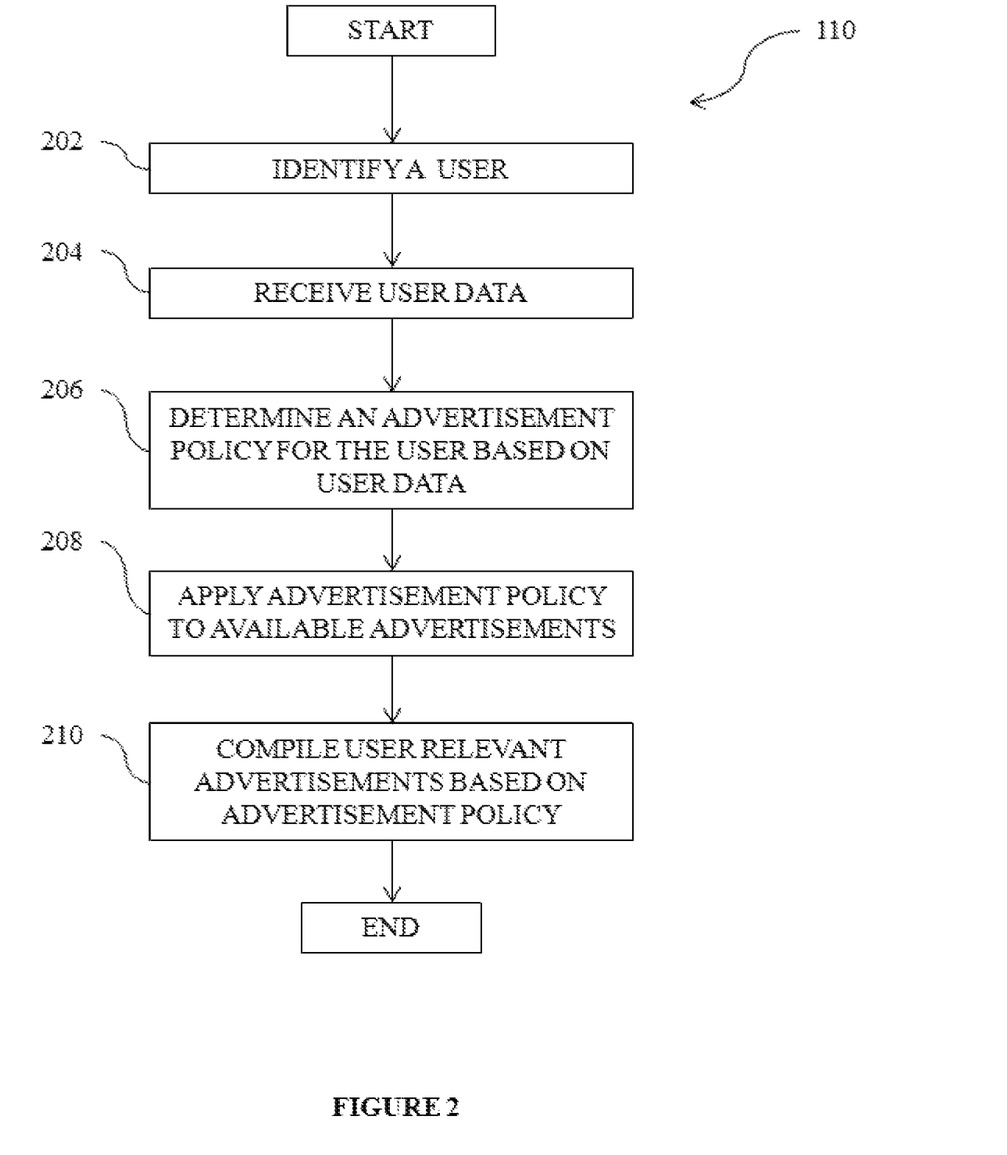
FIG. 2 is a schematic of a method of using user data to determine an advertisement policy for a user.
Figure 3:
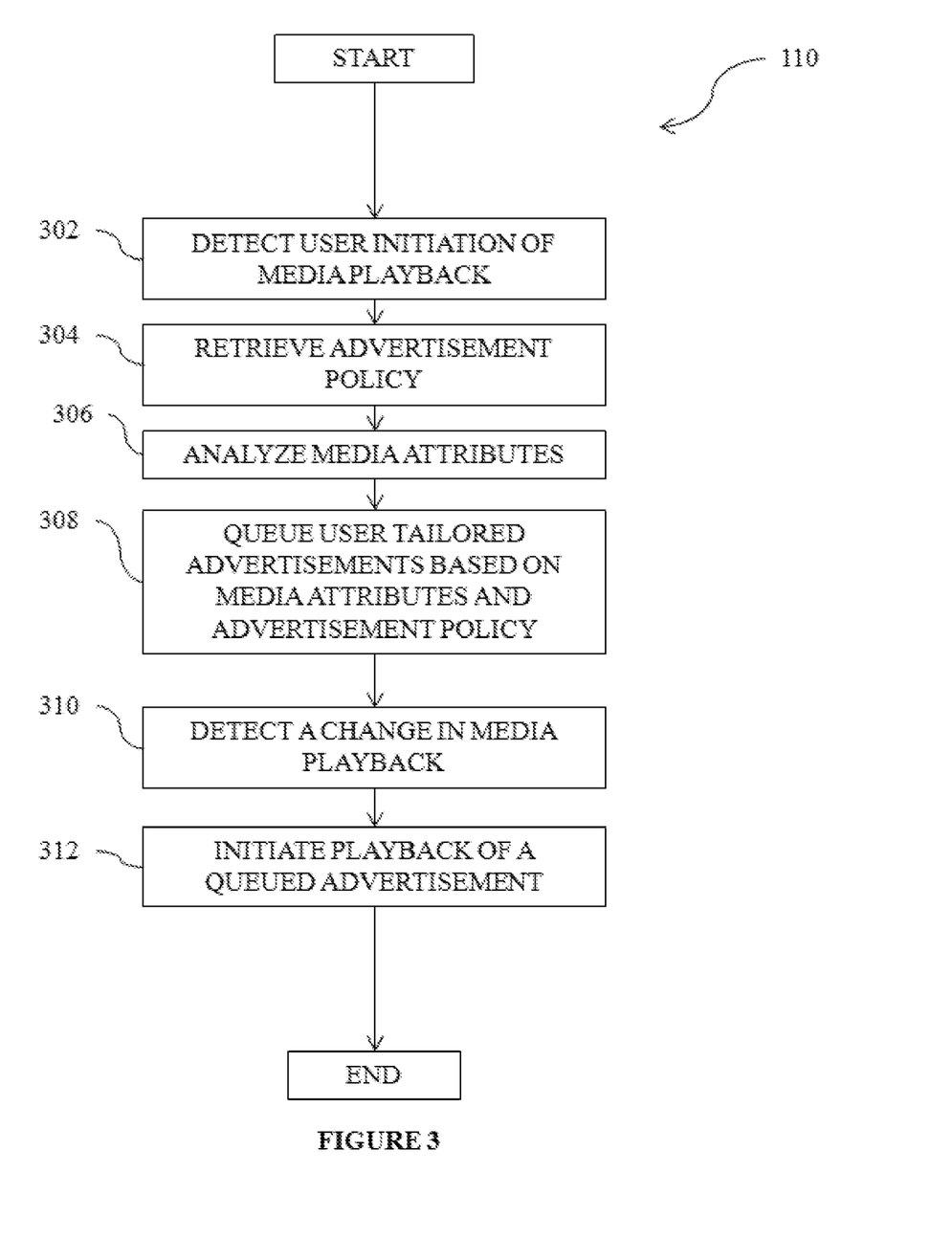
FIG. 3 is a schematic of a method of compiling and initiating playback of advertisements in response to a media playback action.
Figure 4:
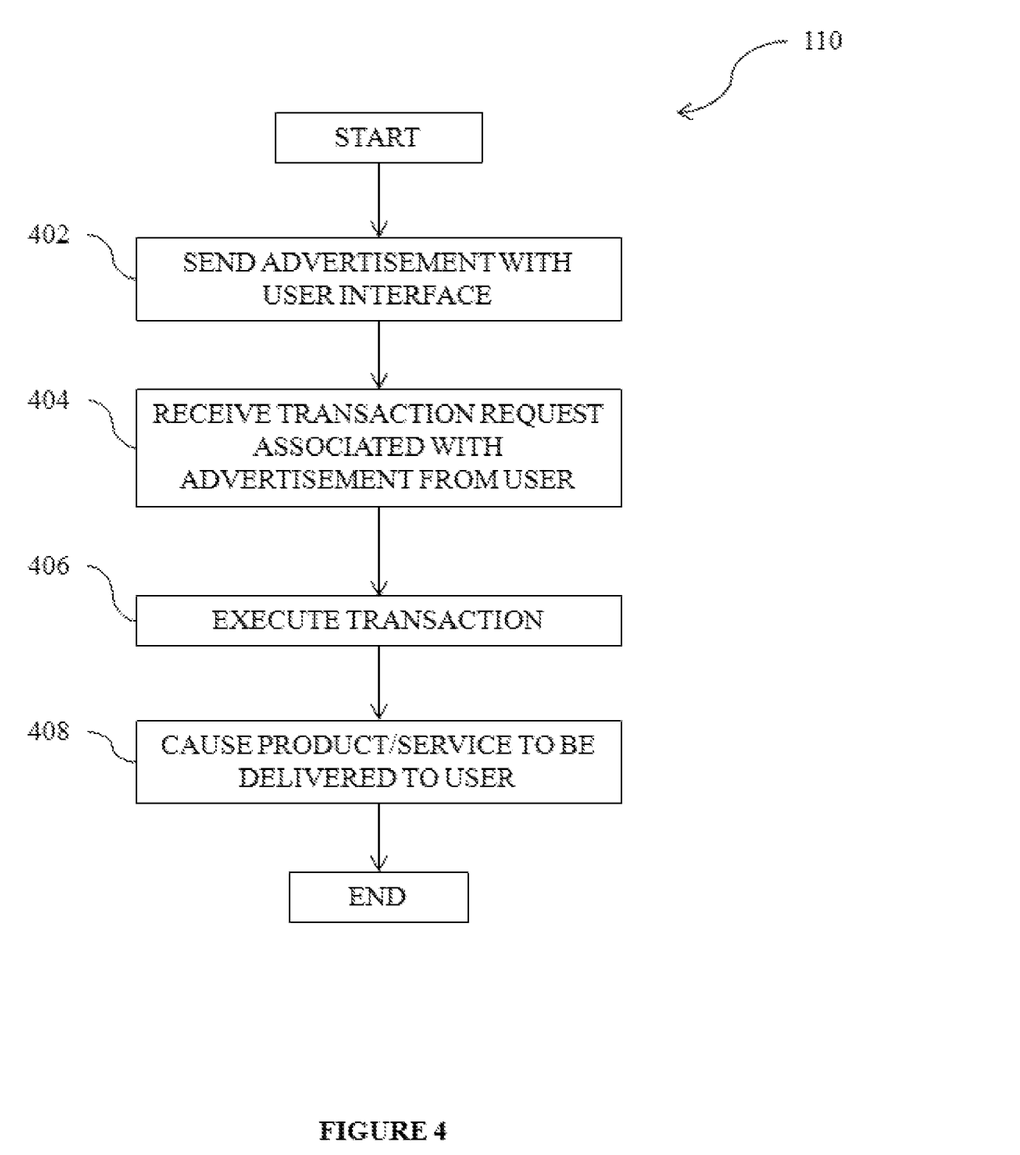
FIG. 4 is a schematic of a method of executing a transaction via a media playback action initiated interactive advertisement.

Ad engine 110 is depicted and described in more detail in FIG. 2, FIG. 3, and FIG. 4.

Database 112 is a repository for data used by ad engine 110. In the depicted embodiment, ad engine 110 resides on server computer 108. However, database 112 can reside anywhere within a distributed data processing environment provided that ad engine 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

FIG. 2 is a schematic of a method of using user data to determine an advertisement policy for a user.

Ad engine 110 identifies a user (step 202).

In one embodiment, ad engine 110 identifies a user based on a user credential inputted through ad interface 106. User credentials can include any one or more identifying attributes of a user.

For example, ad engine 110 can identify a user through a user name and associated alphanumeric password inputted through log-in process on an internet-connected smart TV. In another example, ad engine 110 can identify a user through an internet protocol (IP) address tied to a desktop computer. In yet another example, ad engine 110 can identify a user through biometric data inputted through a fingerprint reader on a laptop.

Biometric data can include, but is not limited to, fingerprints, retinal scans, image recognition, facial recognition, and speech recognition. It is also contemplated that user device 104 can collect biometric data using any combination of sensors. Sensors can include, but are not limited to, infrared cameras, flood illuminators, proximity sensors, ambient light sensors, capacitive touch sensors, pressure-based touch sensors, and microphones.

In a related embodiment, ad engine 110 can use a combination of user credentials to identify a user. For example, ad engine 110 can use a combination of a facial recognition scan and an IP address to identify the user. In another example, ad engine 110 can use a combination of a pin number and a fingerprint scan to identify the user.

However, it is contemplated that ad engine 110 can identify a user in any manner contemplated in the art.

Ad engine 110 receives user data (step 204).

It is contemplated that user data can be retrieved from local storage and/or remote storage. User data can include any data associated with a user, including, for example, purchasing behavior, media consumption behavior, media content data, geolocation data, and biometric data.

In one embodiment, ad engine 110 receives user data from database 112 residing remotely on server computer 108. For example, ad engine 110 can receive data regarding a user's viewing habits, shows watched, purchase history, and recent keyword searches from a solid-state drive (SSD) residing in a remote server through the Internet. In another example, ad engine 110 can receive data regarding a user's viewing habits from multiple databases in a distributed database system in a cloud environment.

Ad engine 110 determines an advertisement policy for the user based on the user data (step 206).

An advertisement policy can comprise any one or more parameters that guide ad engine 110 in the selection of advertisements for a user.

In one embodiment, ad engine 110 determines an advertisement policy for a user using one or more metrics associated with the user data. For example, ad engine 110 can use data regarding user screen time, most watched genres, and commonly purchased products/services to set parameters for advertisement selection. It is contemplated that the parameters can be set by one or more algorithms.

In some embodiments, ad engine 110 can determine an advertisement policy for a user using one or more machine learning algorithms. Machine learning algorithms can include, but are not limited to, linear regression analysis, supervised learning, time-series analysis, and neural networks.

For example, ad engine 110 can use a supervised learning classifier to identify that the user frequently watches animated content directed to a mid-20-year-old demographic. Ad engine 110 can further use a time-series analysis to determine that the user consumes the most content between the hours of 7:00 A.M-8:00 A.M. and 6:00 P.M.-10:00 PM. Ad engine 110 can even further use a linear regression analysis to forecast that the user is four times more likely to purchase products during the hours of 8:00 P.M.-9:30 P.M. Based on this information, ad engine 110 can determine a tailored advertisement policy for the user.

Ad engine 110 applies the advertisement policy for the user to available advertisements to select one or more advertisements (step 208).

It is contemplated that advertisements in any media format can be stored locally and/or remotely. It is further contemplated that ad engine 110 can classify the advertisement in any manner contemplated in the art. For example, an advertisement for a male body spray can be can be classified under "30 second ad", "20-30 years old", "quirky humor", and "interactive". In another example, an advertisement for a high-end laptop computer can be classified under "expensive", "technology", and "designer".

Using these classifications, ad engine 110 can quickly target and retrieve relevant advertisements based on user viewing behaviors. For example, ad engine 110 can quickly select advertisements most relevant to a 23-year-old video game enthusiast by searching for ads under the classifications "gamer", "massively multiplayer online role-playing game", "alcohol", and "animated".

Similarly to step 206, ad engine 110 can use one or more machine learning algorithms to classify advertisements and to select one or more relevant advertisements. For example, ad engine 110 can use a supervised learning classifier to determine what type of advertisement content receives the most clicks and/or purchase orders from a user. By analyzing the historically successful ads, ad engine 110 can determine which advertisements contain content that is the most likely to elicit a click and/or purchase order from the user.

Ad engine 110 compiles user relevant advertisements based on the advertisement policy (step 210).

After applying the advertisement policy to select one or more advertisements, ad engine 110 compiles the advertisements for later playback. In some embodiments, ad engine 110 retrieves advertisement data (e.g., audio and video files, etc.) and stored the advertisement data in local memory for later playback. For example, ad engine 110 can cause user device 104 to pre-load advertisement content into random access memory (RAM) for later playback during a user-initiated pause.

FIG. 3 is a schematic of a method of compiling and initiating playback of advertisements in response to a media playback action.

Ad engine 110 detects user initiation of media playback (step 302).

In one embodiment, ad engine 110 detects the selection of a media file for playback. For example, ad engine 110 can detect the selection of a television comedy from an over-the-top media streaming service. In another example, ad engine 110 can detect a user resuming playback of paused content.

In some embodiments, ad engine 110 detects user actions prior to initiation of media playback. For example, ad engine 110 can detect a video streaming device waking up from a sleep mode and detect which shows the user scrolls over prior to making a final selection.

It is contemplated that detecting user actions prior to initiation of media playback enables ad engine 110 to analyze and predict the type of media content that the user will eventually select. For example, ad engine 110 can detect that a user has scrolled over and read the synopsis of three romantic comedies. Based on detected user behavior, ad engine 110 can predict one or more media attributes of the final selection, which can, for example, allow ad engine 110 to start compiling relevant advertisements.

Ad engine 110 retrieves the advertisement policy (step 304).

In a preferred embodiment, ad engine 110 retrieves the advertisement policy from database 112 stored remotely in server computer 108. However, ad engine 110 can retrieve the advertisement policy from any one or more storage mediums. For example, ad engine 110 can retrieve the advertisement policy from a distributed database system (e.g., cloud storage).

Ad engine 110 analyzes media attributes to filter one or more advertisements from available advertisements (step 306).

Media attributes include any objective and subjective characteristics of the media content itself. Objective characteristics can include, for example, total playback time, listed actors/actresses, total number of episodes, and genres. Subjective characteristics can include, for example, type of humor, tone, and pacing. However, the objective and subjective characteristics listed herein are merely illustrative and are not limited to the provided examples.

It is contemplated that ad engine 110 can use apply the advertisement policy to the analyzed media attributes to assist in determining which advertisements to run. In preferred embodiments, ad engine 110 uses the analyzed media attributes to select advertisements. For example, ad engine 110 can determine that a user selected video spans 2 hours and is associated with the horror genre. Based on this information, ad engine 110 can select advertisements with darker color tones, set advertisements to run every 15 minutes, and set advertisement breaks to a length of 4 minutes per break.

Ad engine 110 queues advertisements based on the analyzed media attributes and the advertisement policy (step 308).

It is contemplated that ad engine 110 queues advertisements that are the most relevant to the user by applying the user-specific advertisement policy to the filtered advertisements based on analyzed media attributes.

For example, ad engine 110 can, based on the advertisement policy for a user, determine that advertisements associated with the classifiers "college-educated", "male-oriented", "liberal", and "less than 30 seconds long" are the most relevant to a 20-year-old college student. Ad engine 110 can further determine that the user averages 4 pauses per hour for with an average pause-length of 3 minutes for long-form content (e.g., playback time of greater than one hour long). As a result, ad engine 110 can select a group of 45 advertisements that are each less than 30 seconds long and directed to comedic themes from a pool of advertisements based on the analyzed media being a slapstick comedy movie that spans a length of 2 hours. Following this selection of 45 advertisements, ad engine 110 can select 16 30-second-long advertisements and schedule them in order of ascending relevance to the user based on the advertisement policy (e.g., male, mid-twenties, college-educated) indicated by the advertisement policy. The queued advertisements can then playback in the designated order when the user pauses the movie.

In another example, ad engine 110 can select a group of 40 advertisements that are each less than 30 seconds long and directed to financial topics from a pool of advertisements based on the analyzed media being a series of 10 fifteen-minute-long investment tutorial videos. Following this selection of 40 advertisements, ad engine 110 can select 20 thirty-second-long advertisements and schedule them in order of ascending relevance to the user's demographics (e.g., female, high-income, doctor, home-owner, etc.) indicated by the advertisement policy.

Ad engine 110 detects a change in media playback (step 310).

In a preferred embodiment, ad engine 110 detects a user-initiated pause in media play back. For example, ad engine 110 can detect a "pause" command during playback of a movie in a streaming service. In another example, ad engine 110 can detect a "pause" command from a verbal user command spoken into a microphone. In another example, ad engine 110 can detect a "pause" command from a user gesture using one or more image recognition techniques. However, it is contemplated that ad engine 110 can detect a user-initiated pause in any manner contemplated in the art.

In another embodiment, ad engine 110 detects a pause in at least one element associated with media playback. Elements in a streaming video, for example, can include the audio track, the video file, and closed captioning overlays. However, elements can include any one or more separable components of any media format known in the art.

In one example, ad engine 110 can detect that a user muted the audio track but the video file continues to play. In this example, ad engine 110 can play another audio file in place of the original audio track.

In a preferred example, ad engine 110 can detect that a user turned off the display without pausing media playback. In response, ad engine 110 can play advertisements tailored to non-video based media playback (e.g., radio commercials).

In yet another example, ad engine 110 can detect that a user turns off the closed captions (i.e., subtitles). In response, ad engine 110 can insert textual and/or graphical advertisements in the space that the closed captions would normally occupy.

In interactive software applications, such as video games, ad engine 110 can detect that a user pauses the game. In response, ad engine 110 can insert an interactive advertisement in the video game, such as a video, an interactive ad, text, and any other advertising material. It is contemplated that the advertisements can be sourced from any entity, including third-party entities. For example, ad engine 110 can deliver advertisements that are not limited to purchases associated with the video game, but can also include non-interactive and interactive advertisements for third parties (e.g., an interactive advertisement allowing a user to order delivery from a food delivery service directly in the video game).

Ad engine 110 initiates playback of a queued advertisement (step 312).

In a preferred embodiment, ad engine 110 initiates the playback of a queued advertisement stored on a local storage media (e.g., internal hard drive, internal solid-state drive, random access memory, etc.). For example, ad engine 110 can detect a user-initiated pause in the playback of a streaming comedy and cause playback of a humorous advertisement from a data buffer in RAM.

In another embodiment, ad engine 110 retrieves a queued advertisement from database 112 residing on server computer 108. For example, ad engine 110 can retrieve actively begin retrieving data for an advertisement into a buffer once ad engine 110 detects a pause in the playback. While actively playing the advertisement to the user, ad engine 110 can continue retrieving the remainder of the queued advertisement into the buffer.

Ad engine 110 can initiate playback of a queued advertisement over any broadcast medium. In a preferred embodiment, ad engine 110 initiates playback through an over-the-top system. OTT systems can include any one or more systems or elements of a larger system that use publicly accessible internet connections to deliver video streams. OTT systems advantageously allow digital content to be accessible by any devices that can access the internet and establish a connection with ad engine 110. As such, an advertiser can create one version of an advertisement that can be formatted and played across multiple different devices (e.g., a tablet, a phone, and a laptop) without the restrictions of closed systems and proprietary formats. For example, ad engine 110 can initiate ad playback in an online streaming service that allows users to view the same advertisements through multiple internet connected devices, including, for example, smart phones, laptops, and tablet computers.

Further, ad engine 110 can deliver the advertisements in the form of program instructions that allows advertisements to have interactive elements. It is contemplated that interactive elements can allow advertisements to receive new program instructions from a user. For example, when a user pauses a video on their smart phone, ad engine 110 can initiate playback of an interactive advertisement that further allows the user to input an order for fast food delivery straight through an internet-connect television, smart phone, and/or tablet computer. The advertisement can further include additional functionality, including, for example, a map showing the location of your delivery driver after a user places a food delivery order using an advertisement user interface.

By allowing interactive advertisements to OTT video playback technologies, the efficacy and functionalities of advertisements can be greatly enhanced and reach a far broader audience than traditional closed advertising systems, such as, for example, advertisements delivered through conventional television set-top boxes. Additionally, advertisement functionalities can be modified in substantially real-time to allow for quick changes to advertisements based on changing advertising variables. For example, ad engine 110 can allow a programmer to add facial recognition-based authentication to an advertisement when facial recognition technology is incorporated into a newly released smart phone.

In some embodiments, ad engine 110 initiates playback over and internet protocol television (IPTV) system. IPTV systems limit delivery of advertisements through ad engine 110 to a closed system. For example, ad engine 110 can send advertisements over the internet to a set-top box that is owned and operated by an external entity.

FIG. 4 is a schematic of a method of executing a transaction via a media playback action initiated interactive advertisement.

Ad engine 110 displays an interactive advertisement with a user interface (step 402).

In a preferred embodiment, ad engine 110 displays an interactive advertisement stored on a local storage media (e.g., internal hard drive, internal solid-state drive, random access memory, etc.). For example, ad engine 110 can detect a user-initiated pause in the playback of a streaming comedy and cause playback of an interactive advertisement that includes a hyperlink to the website for the advertised product and an input field for a user to submit an email address for future promotional offers for the advertised product. In another example, ad engine 110 can display an online music streaming service advertisement with various input fields to directly facilitate the purchase of the advertised product (e.g., signing up for a trial period, purchasing the product, etc.).

Ad engine 110 receives a transaction request via a user input associated with the advertisement (step 404).

In one embodiment, ad engine 110 can receive a transaction request via a user input to a device displaying the advertisement. For example, ad engine 110 can receive a transaction request from a user inputting payment information into the advertisement interface on an internet-enabled television (e.g., smart TV) and selecting a "confirm purchase" button using a television remote.

In some embodiments, ad engine 110 can cooperate with separate user devices with separate user interfaces to interact with the advertisement. For example, ad engine 110 can display a quick-response code on an advertisement to allow a user to automatically be directed to a product's website. In another example, ad engine 110 can allow a user to input authentication for a purchase through an interactive ad through a smart phone.

It is further contemplated that user devices with unique interfaces can use any means of receiving user input. For example, the user device can be a smart phone with a fingerprint reader used to authenticate a transaction associated with an interactive advertisement. In another example, the user device can be a smart phone with a depth sensing camera used to authenticate a user based on the user's unique combination of facial features. In yet another example, a user device can be a smart watch that receives a password from the user to authenticate a transaction.

Ad engine 110 executes a transaction (step 406).

It is contemplated that any transaction between a user and an entity associated with an advertisement can be executed by ad engine 110.

In one embodiment, ad engine 110 executes a financial transaction between a product provider and a user/customer. For example, ad engine 110 can authenticate payment details and shipping information for a pizza to be delivered from a restaurant to a user's house.

In another embodiment, ad engine 110 can execute an exchange of information between a user and a product/service provider. For example, ad engine 110 can send user information inputted into an advertisement interface to a service provider to activate a one-month trial of a music streaming service.

Ad engine 110 causes a product and/or a service to be delivered to a user (step 408).

It is contemplated that ad engine 110 can cause a product and/or a service to be delivered to a user in any manner known in the art. For example, ad engine 110 can cause a physical product to be shipped from a warehouse to the customer. In another example, ad engine 110 can deliver streaming movies from a streaming video service after a user activates their account.

It should be noted that while the description discusses embodiments comprising computer-based controllers, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for displaying tailored advertising in response to user media playback behavior via an over-the-top data delivery system, comprising:
   verifying an identity of the user;
   analyzing historical data associated with the identity, wherein the historical data includes patterns of user behavior associated with one or more advertisements;
   detecting media playback by the user;
   analyzing content associated with the media playback;
   retrieving an advertisement rule associated with the user;
   queueing user tailored advertisements based on the analyzed content and the advertisement rule; and
   delivering an advertisement from any one or more third-party services in response to detecting a pause in the media playback.

2. The method of claim 1, wherein the advertisement rule controls selection of advertisements based on a variable selected from the group consisting of: permitted brands, permitted themes, advertisement length, advertisement content, advertisement format, seasonality, user advertisement preferences, derived user advertisement preferences, and technical specifications of a playback device.

3. The method of claim 1, wherein analyzing the media content further comprises analyzing a media attribute selected from the group consisting of: total playback time, format, designated commercial breaks, subject matter, themes, actors, production studios, and playback permissions.

4. The method of claim 1, further comprising:
   creating the advertisement rule for the user;
   applying the advertisement rule to a group of available advertisements; and
   compiling the user-tailored advertisements based on the advertisement rule.

5. The method of claim 1, wherein the advertisement is configured to receive user input via a user interface.

6. The method of claim 5, further comprising:
   receiving a user purchase request associated with the advertisement;
   executing the user purchase request; and
   causing one or more of a product and a service to be delivered to the user.

7. The method of claim 5, further comprising:
   receiving a user information input associated with the advertisement; and
   storing the user information.

8. A method for displaying tailored advertising on a media player through a content provider-based software application, comprising:
   retrieving an advertisement rule associated with a user;
   analyzing content associated with the media player through the content provider-based software application;
   selecting one or more advertisements that are tailored to the user based on the analyzed content and the advertisement rule; and
   displaying the one or more advertisements on the media player through the content provider-based software application in response to receiving a pause command during playback of the content.

9. The method of claim 8, wherein the content comprises one or more media files stored in a database.

10. The method of claim 8, wherein the one or more advertisements comprises one or more media files stored in a database.

11. The method of claim 8, wherein the content is selected from the group consisting of: a television show, a streaming video, a movie, a video game, and an audio recording, wherein the content comprises any one or more of short form content and long term content.

12. The method of claim 8, wherein the media player through the content provider-based software application is selected from the group consisting of: a computer, a television, a tablet computer, a smart phone, a smart watch, a projector, and an audio playback device.

* * * * *

UNITED STATES PATENT AND TRADEMARK OFFICE
CERTIFICATE OF CORRECTION

PATENT NO. : 10,728,619 B2
APPLICATION NO. : 16/228607
DATED : July 28, 2020
INVENTOR(S) : Charles Johnson Page 1 of 1

It is certified that error appears in the above-identified patent and that said Letters Patent is hereby corrected as shown below:

In the Claims
At Column 12 Lines 35 to 48, In Claim 8, change:
"A method for displaying tailored advertising on a media player through a content provider-based software application, comprising:
retrieving an advertisement rule associated with a user;
analyzing content associated with the media player through the content provider-based software application;
selecting one or more advertisements that are tailored to the user based on the analyzed content and the advertisement rule; and
displaying the one or more advertisements on the media player through the content provider-based software application in response to receiving a pause command during playback of the content."
To:
--A method for displaying tailored advertising on a media player through a content provider-based software application, comprising:
verifying an identity of a user;
analyzing historical data associated with the identity, wherein the historical data includes patterns of user behavior associated with one or more advertisements;
analyzing content associated with the media player through the content provider-based software application;
retrieving an advertisement rule associated with a user;
selecting one or more advertisements that are tailored to the user based on the analyzed content and the advertisement rule; and
delivering the one or more advertisements from any one or more third-party services on the media player through the content provider-based software application in response to receiving a pause command during playback of the content.--

Signed and Sealed this
Tenth Day of August, 2021

Drew Hirshfeld
*Performing the Functions and Duties of the
Under Secretary of Commerce for Intellectual Property and
Director of the United States Patent and Trademark Office*